United States Patent
Guthrie et al.

(10) Patent No.: US 9,372,797 B2
(45) Date of Patent: Jun. 21, 2016

(54) ADAPTIVELY ENABLING AND DISABLING SNOOPING FASTPATH COMMANDS

(71) Applicant: International Business Machines Corporation, Armonk, NY (US)

(72) Inventors: Guy L. Guthrie, Austin, TX (US); Hien M. Le, Cedar Park, TX (US); Hugh Shen, Round Rock, TX (US); Derek E. Williams, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 14/176,775

(22) Filed: Feb. 10, 2014

(65) Prior Publication Data
US 2015/0227464 A1   Aug. 13, 2015

(51) Int. Cl.
*G06F 12/08*   (2016.01)

(52) U.S. Cl.
CPC ........ *G06F 12/0831* (2013.01); *G06F 12/0862* (2013.01); *G06F 2212/621* (2013.01)

(58) Field of Classification Search
CPC ............ G06F 12/0831; G06F 12/0862; G06F 2212/621
See application file for complete search history.

(56) References Cited

U.S. PATENT DOCUMENTS

| | | | |
|---|---|---|---|
| 8,006,068 B1 * | 8/2011 | Steiner ........................... | 712/34 |
| 2007/0113019 A1 | 5/2007 | Beukema et al. | |
| 2009/0158022 A1 * | 6/2009 | Radhakrishnan et al. ........ | 713/2 |
| 2011/0213935 A1 * | 9/2011 | Greenhalgh et al. .......... | 711/146 |
| 2012/0110270 A1 * | 5/2012 | Moyer .......................... | 711/146 |
| 2013/0067125 A1 * | 3/2013 | Rizzo et al. ..................... | 710/38 |

FOREIGN PATENT DOCUMENTS

| | | |
|---|---|---|
| EP | 0166341 | 5/1992 |
| WO | 2012170719 | 12/2012 |
| WO | 2013048494 | 4/2013 |

OTHER PUBLICATIONS

Ranganathan, Aanjhan , "Master Project to obtain the title of Master of Science Specialisation: Electronics and Microelectronics", 2010 , 43 Pages.

* cited by examiner

*Primary Examiner* — Yong Choe (74) *Attorney, Agent, or Firm* — DeLizio Law, PLLC (57) ABSTRACT

Statistical data is used to enable or disable snooping on a bus of a processor. A command is received via a first bus or a second bus communicably coupling processor cores and caches of chiplets on the processor. Cache logic on a chiplet determines whether or not a local cache on the chiplet can satisfy a request for data specified in the command. In response to determining that the local cache can satisfy the request for data, the cache logic updates statistical data maintained on the chiplet. The statistical data indicates a probability that the local cache can satisfy a future request for data. Based at least in part on the statistical data, the cache logic determines whether to enable or disable snooping on the second bus by the local cache.

14 Claims, 6 Drawing Sheets

ADAPTIVELY ENABLING AND DISABLING SNOOPING FASTPATH COMMANDS

BACKGROUND

Embodiments of the inventive subject matter generally relate to the field of computer processors, and, more particularly, to adaptively enabling and disabling snooping fastpath bus commands.

A current trend of computer architecture is increasing the number of core processors in a multi-core symmetrical multi-processor (SMP). In a high performance server chip, there typically can be eight or more SMP cores. The growth in the number of cores on a single chip brings many new challenges for chip design. Chip footprints are bigger and there are many more bus requesters. Thus, it takes longer to broadcast commands to all snooper agents on a snoop bus. Power consumption is another major factor in chip design, as adding core processors to a chip increases the power requirements of the chip.

In snoop based cache coherency design, all the coherent memory accesses are seen by all snooper entities (e.g., caches and memory controllers). To improve latency for critical memory accesses (i.e. demand load), the concept of fastpath (FP) was created. Memory accesses that are considered critical (e.g., demand loads) that need to go on a fabric bus to complete are referred to as eligible FP commands. Eligible FP commands are broadcast on a specially engineered bus (FP bus) to all the snoopers (typically caches and memory controllers) that may provide data in response to the command. A command that goes on the FP bus is referred to as an FP command. FP allows critical memory accesses to bypass arbitration logic and queuing structures to reduce latency. In addition, optimal engineering of an FP bus minimizes wire delay so that a FP command can reach all the pertinent snoopers on a chip in a shortest time.

Depending on the data stream and applications running, data accessed by an FP command can either be in memory or caches. Some processors and cache systems can implement early data intervention processes. Early data intervention refers to the ability of a cache to supply data in response to a command using the fastpath bus. Depending on how data is shared, a cache may or may not be able to provide early data intervention even if it has the cache line. Thus an implementation of fastpath that blindly responds to all FP commands wastes directory read bandwidth and unnecessarily consumes power reading the cache directory for FP commands in cases where the cache cannot send data for early data intervention.

SUMMARY

Various embodiments are disclosed for enabling and disabling snooping on a fastpath bus of a processor. In one embodiment, a command is received via a first bus or a second bus communicably coupling processor cores and caches of chiplets on the processor. Cache logic on a chiplet determines whether or not a local cache on the chiplet can satisfy a request for data specified in the command. The cache logic updates statistical data maintained on the chiplet. The statistical data indicates a probability that the local cache can satisfy a future request for data. Based at least in part on the statistical data, the cache logic determines whether to enable or disable snooping on the second bus by the local cache.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a fastpath bus, other component interconnects such as switches, fabrics etc. may be used. Additionally, the description below describes functionality provided in an L2 cache component. Other cache components could implement the same or similar functionality; such implementations are within the scope of the inventive subject matter. In other instances, well-known instruction instances, protocols, structures and techniques have not been shown in detail in order not to obfuscate the description.

Generally speaking, the embodiments include systems and methods that enable or disable bus snooping on a fastpath bus based on statistics maintained by fastpath bus logic. If the statistics determine that a cache is likely to be able to provide for early data intervention for commands received on a fastpath bus, then snooping can be enabled for the fastpath bus and directory lookups and fastpath processing are enabled for commands received over the fastpath bus. Alternatively, if the statistics determine that the cache is not likely to be able to provide early data intervention for requests received on the fastpath bus, then bus snooping can be disabled, thereby saving power and processing resources.

Figure 1:
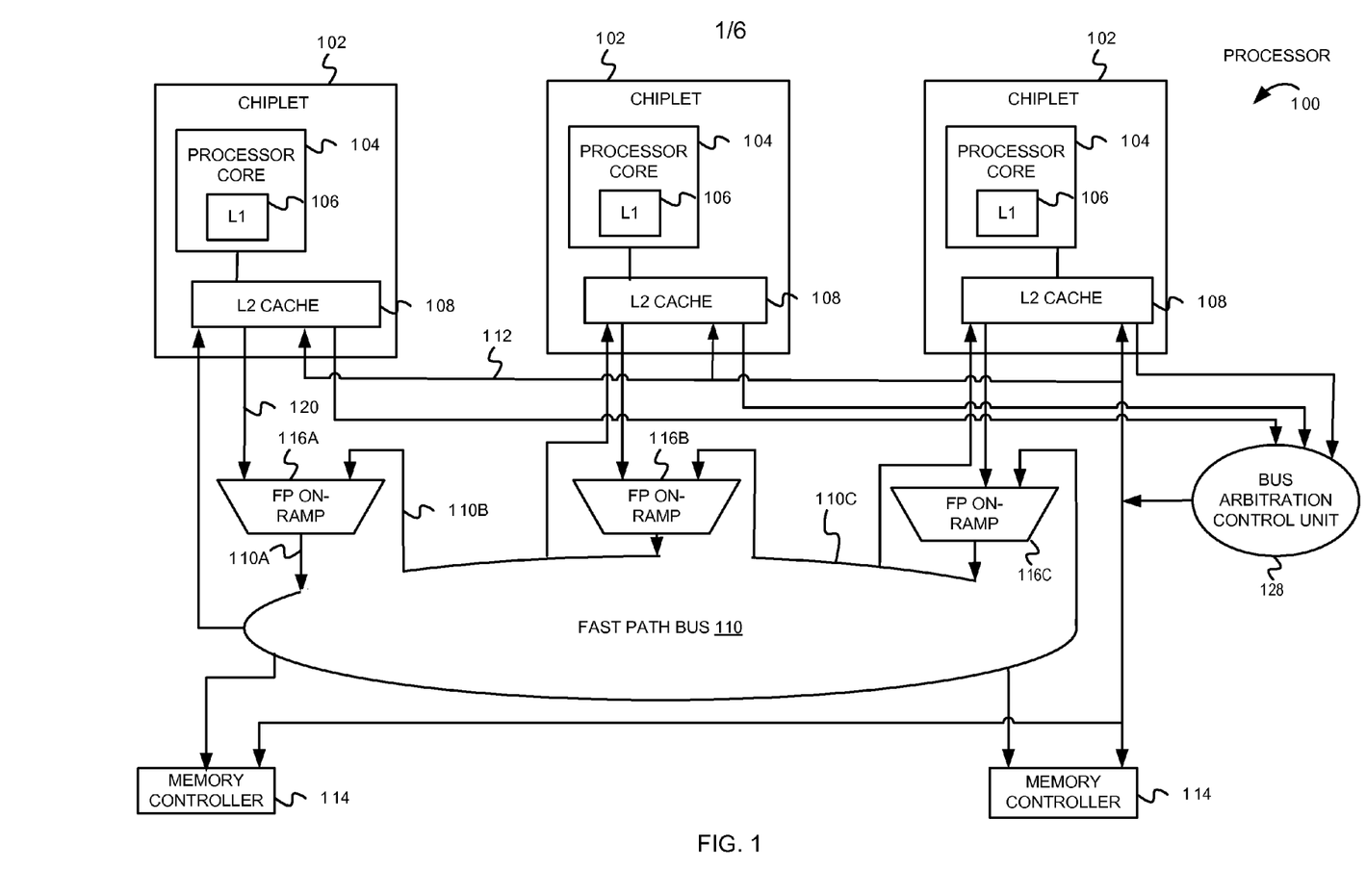
FIG. 1 is a block diagram illustrating components of a processor according to embodiments.

FIG. 1 is a block diagram illustrating components of a processor 100 according to embodiments. Processor 100 includes chiplets 102, fastpath bus 110, arbitrated bus 112 and memory controllers 114. In some embodiments, processor 100 can be an SMP.

A chiplet 102 can include a processor core 104 and supporting logic units for the processor core, an L1 cache 106, and an L2 cache 108. Although three chiplets are illustrated in FIG. 1, one of skill in the art having the benefit of the disclosure will appreciate that a processor 100 may include fewer or more than three chiplets.

Chiplets 102 can be communicably coupled using multiple interconnects such as busses, switches, fabrics etc. In some embodiments, components such as chiplet 102 memory controller 114 and other components of processor 100 are interconnected with a fastpath bus 110 and an arbitrated bus 112. In some embodiments, fastpath bus 110 comprises a non-arbitrated interconnect between components of chiplet 102. Because fastpath bus 110 is not arbitrated, bus commands can be transferred between components more rapidly than through arbitrated bus 112. Components that send or receive commands on fastpath bus 110 include FP on-ramps 116A-C (generically referred to as FP on-ramp 116) that implement logic that controls whether or not the chiplet 102 can transmit a command over fastpath bus 110. Those of skill in the art having the benefit of the disclosure will appreciate that other components other than chiplet 102 may transmit commands over fastpath bus 110. Segments of fastpath bus 110 between FP on-ramps 116A-C are identified as fastpath bus 110A-C. Each FP on-ramp 116 receives two inputs. As illustrated in FIG. 1, FP on-ramp 116A receives input 120 from an L2 cache 108 of a chiplet 102. In addition, FP on-ramp 116A receives input from fastpath bus 110B from an FP on-ramp 116B that precedes FP on-ramp 116A on fastpath bus 110. Upon receiving an FP command from L2 cache 108 via input 120, the logic implemented in an FP on-ramp 116A determines using the input from fastpath bus 110B if a command from an upstream FP on-ramp 116B is being transmitted over fastpath bus 110B. If a command from an upstream FP on-ramp 116B is currently being transmitted on fastpath bus 110B, then the logic implemented in FP on-ramp 116A prevents the command received from being transmitted over fastpath bus 110A. In some embodiments, the command is silently dropped. This can be safely done because the command will still be transmitted over arbitrated bus 112 as an FP mate command. If, however, a command is received on input 120 and no command is present on input 110B, the command received on input 120 is passed to the output of FP on-ramp 116. Additionally, if no command is received on input 120, FP on-ramp 116A merely passes on any command, if present, on input from fastpath bus 110B to the output of FP on-ramp 116A. Output from FP on-ramp 116 proceeds to the next FP on-ramp on fastpath bus 110. FP on-ramps 116B and 116C operate similarly to FP on-ramp 116A and thus in some embodiments create a ring structure that will pass existing fastpath commands and will only allow new commands to enter fastpath bus 110A-C when a "slot" is available at a given FP on-ramp 116.

Arbitrated bus 112 communicates bus commands between processor 100 components. Arbitrated bus 112 is arbitrated such that one unit (e.g., memory controller 114, L2 cache 108 etc.) coupled to the bus is allowed to use the bus at any particular point in time. Command transfer over arbitrated bus 112 is typically slower than over fastpath bus 110. For instance, commands typically must make their way to a bus arbitration control unit 128 to be arbitrated onto bus 112. Further the arbitration process performed by logic in bus arbitration control unit 128 can take significant time in making an arbitration decision and holding commands in queues while said decision is made. Finally, the commands must be broadcast back to chiplets 102 and memory controllers 114 over arbitrated bus 112. All of these factors can contribute to the amount of time it takes to transmit commands over arbitrated bus 112.

Memory controllers 114 provide an interface for chiplets 102 to access a memory component (not shown). The memory component may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.).

Figure 2:
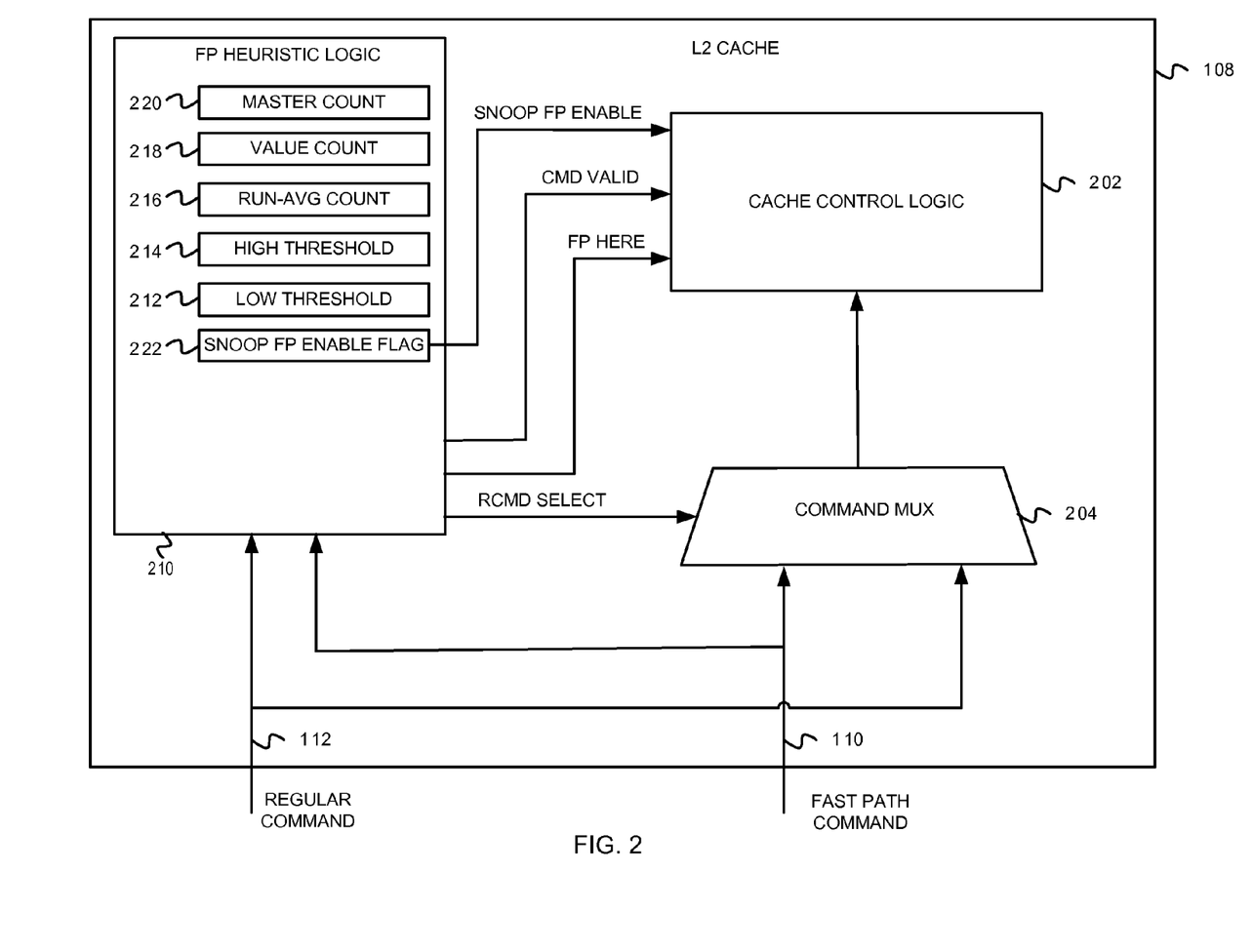
FIG. 2 is a block diagram illustrating a cache according to embodiments.

FIG. 2 is a block diagram illustrating further details of an L2 cache 108 according to embodiments. In some embodiments, L2 cache 108 includes cache control logic 202, command multiplexor 204 and fastpath heuristic logic 210.

Commands may be received by L2 cache 108 via arbitrated bus 112 for commands or fastpath bus 110. FP heuristic logic 210 receives the commands and maintains statistics regarding the commands. In some embodiments, FP heuristic logic maintains a master count 220, value count 218, run-avg count 216, high threshold 214 low threshold 212 and snoop FP enable flag 222.

Master count 220 can be a counter that counts the number of bus commands received by L2 cache 108 during a sample window. Master count 220 can be used to determine if the sample window for sampling bus commands has reached a maximum value and is to be reset to begin a new sample window.

Value count 218 can be a counter that represents the number of eligible FP commands that a cache would have been able to respond to using early data intervention over the sample window. Early data intervention refers to the ability of a cache to supply data in response to a command using the fastpath bus.

Run-avg count 216 can be a running average of value count over time (e.g., value count/master count). In some embodiments, run-avg count 216 is determined at the end of a sample window.

High threshold 214 can be a configurable value used to determine when to enable fastpath snooping on a fastpath bus. When run-avg count 216 goes above high threshold 214, it can be determined that a processor cache most likely can service future fastpath commands. FP heuristic logic 210 enables snooping of FP commands on fastpath bus 110. In some embodiments, fastpath snooping stays enabled until run-avg count 216 goes below the low threshold 212.

Low threshold 212 can be a configurable value. When run-avg count 216 goes below this threshold, it can be assumed that a cache most likely cannot service future FP commands. FP heuristic logic 210 can thus disable snooping of FP commands. In some embodiments, fastpath snooping stays disabled until run-avg count 216 goes above the high threshold 214.

Snoop FP enable flag 222 is a flag that is set to indicate whether or not snooping of fastpath commands is currently enabled or disabled. In some embodiments, a value of zero indicates that snooping fastpath commands is currently disabled and a nonzero value (e.g., one) is used to indicated that snooping fastpath commands is currently enabled. Snoop FP enable flag 222 can be used to drive a Snoop FP Enable signal as described below.

The above-described values and other data can be used by FP heuristic logic 210 to determine output signals that FP heuristic logic 210 can supply to cache control logic 202 or command multiplexor 204. In some embodiments, FP heuristic logic 210 can supply a snoop FP enable signal, a cmd valid signal, an FP here signal and an rcmd select signal.

Snoop FP Enable can be a signal that indicates to cache control logic 202 whether fastpath snooping is enabled or disabled. As an example, a snoop FP enable value of zero may be used to indicate that fastpath snooping is disabled while a non-zero value (e.g., one) may be used to indicate that fastpath snooping is enabled. As will be further described below, high threshold 214, low threshold 212, and the history of FP command eligibility reflected in run-avg count 216 can be used to prevent jittering in the snoop FP enable signal.

Cmd valid can be a signal that indicates to cache control logic 202 whether the output of command multiplexor 204 is valid and is therefore either a command received via arbitrated bus 112 or a fastpath command received via fastpath bus 110.

FP here signal can be a signal that indicates to cache control logic 202 that a command received from command multiplexor 204 is a fastpath command and should be processed accordingly.

Rcmd select can be a signal that is provided to command multiplexor 204 to cause the multiplexor to select which bus (e.g., arbitrated bus 112 or fastpath bus 110) to use to provide a command to cache control logic 202.

During operation, a processor core 104 may issue one or more demand load instructions. In cases where the processor core demand load misses its caches (e.g., L1 cache 106, or L2 cache 108), the demand load is checked to see if it is eligible for fastpath processing. Eligibility for fastpath processing may depend on an instruction type (load vs. store). If the command is eligible for fastpath processing, then two commands are sent. A first command is an FP command that is sent on the FP bus 110 to chiplets 102 and memory controllers 114 on processor 100. The second command is an actual command (referred to as an FP mate command) that is sent on arbitrated bus 112. The FP command will typically arrive at the caches and memory controllers prior to the arrival of its FP mate command. When a cache receives the FP command, it can start a look up process on the cache directory. If the cache has the line in a cache state allowing the cache to safely provide data for the load, it can start sending data back to the requestor immediately. Additionally, when a memory controller 114 sees the FP command, it can speculatively access the memory coupled to the memory controller 114 and read the requested data. In some embodiments, the memory controller waits until the FP mate command arrival and possibly some associated coherence actions before determining that it can serve as a source of the data. However, as the latency to access memory is long, it is often the case these actions will complete (or at least can be substantially overlapped) with the speculative memory access started at the arrival of the fastpath command.

Because an FP mate command is issued for each fastpath command, the caches and memory controllers have the option of ignoring the FP command without violating any coherency protocol. However, caches and memory controllers typically must respond to the FP mate commands when they are received via arbitrated bus 112.

Further details on the operation of the above-described processor 100 are provided below with reference to FIGS. 3-6.

Figure 3:
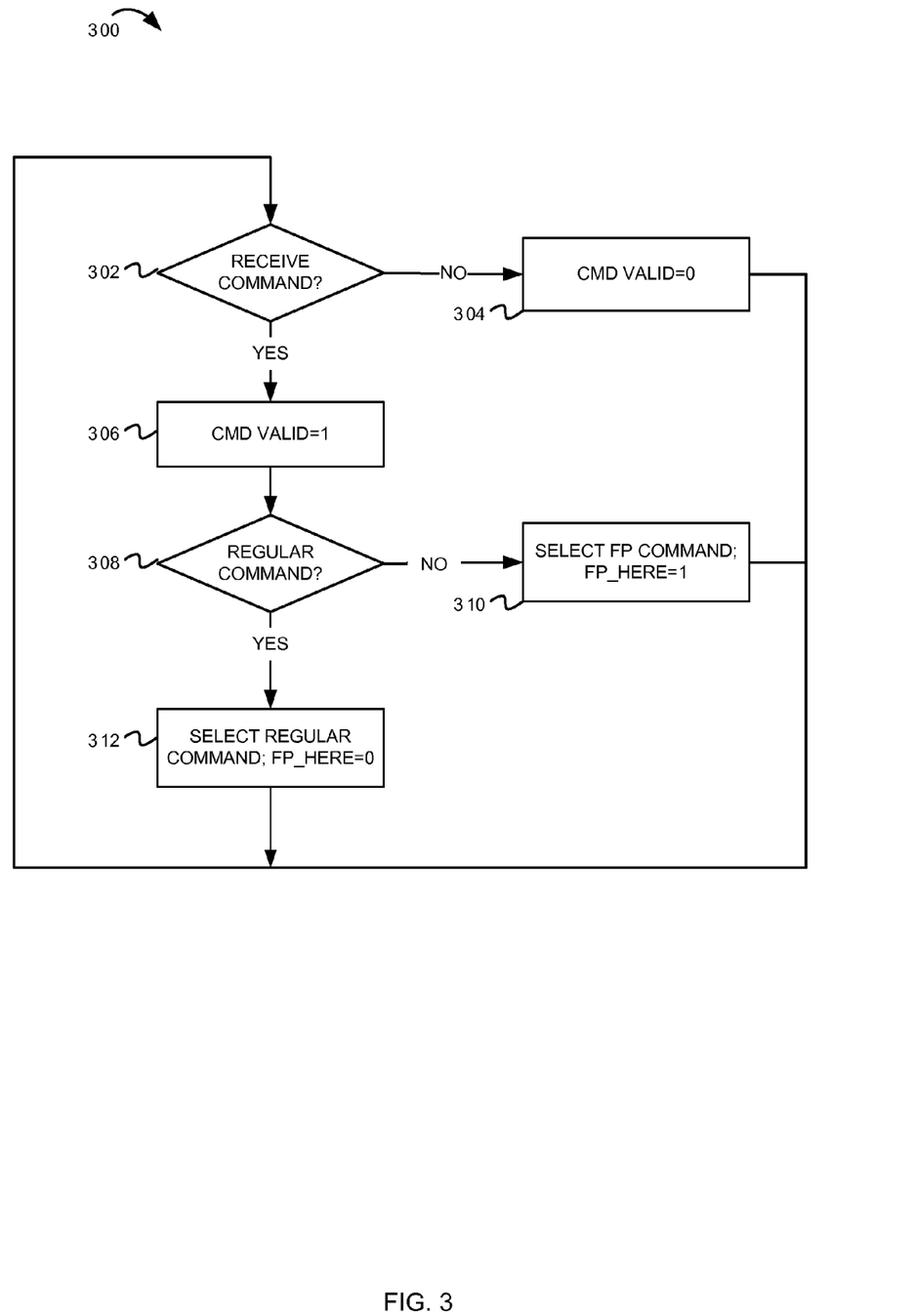
FIG. 3 is a flow chart illustrating a method for selecting a bus command.

FIG. 3 is a flow chart illustrating a method 300 for selecting a bus command. Method 300 can be executed for each clock cycle. Method 300 begins at decision block 302 by determining if a command has been received via a bus. For example, a command may be received by L2 cache 108 via fastpath bus 110 or arbitrated bus 112. If a command has not been received, then at block 304, the cmd valid signal is set to zero to indicate that a command is not present on a bus and the method returns to block 302 for execution during the next clock cycle.

If the check at block 302 determines that a command has been received via a bus, then at block 306 the cmd valid signal is set to 1 to indicate that a command is available.

At decision block 308, a check is made to determine if the command received at block 302 is a regular command or a fastpath command. If the command received at block 302 is not a regular command (i.e., a fastpath command was received), then the method proceeds to block 310, where the select FP command signal is provided to command multiplexor 204 to indicate that the multiplexor should provide the command received via the fastpath bus 110 to the cache control logic 202. In addition, the FP here signal is set to indicate to the cache control logic 202 that the command received from command multiplexor 204 is a fastpath command. The method then returns to block 302 for execution during the next clock cycle.

If the check at block 308 determines that the command was a regular command received via arbitrated bus 112, then at block 312 rcmd select signal is provided to command multiplexor 204 to indicate that the command multiplexor 204 should provide the command received via arbitrated bus 112 to the cache control logic 202. In addition, the FP here signal is set to zero to indicate to the cache control logic 202 that the command received from command multiplexor 204 is a normal command. The method then returns to block 302 for execution during the next clock cycle.

Figure 4:
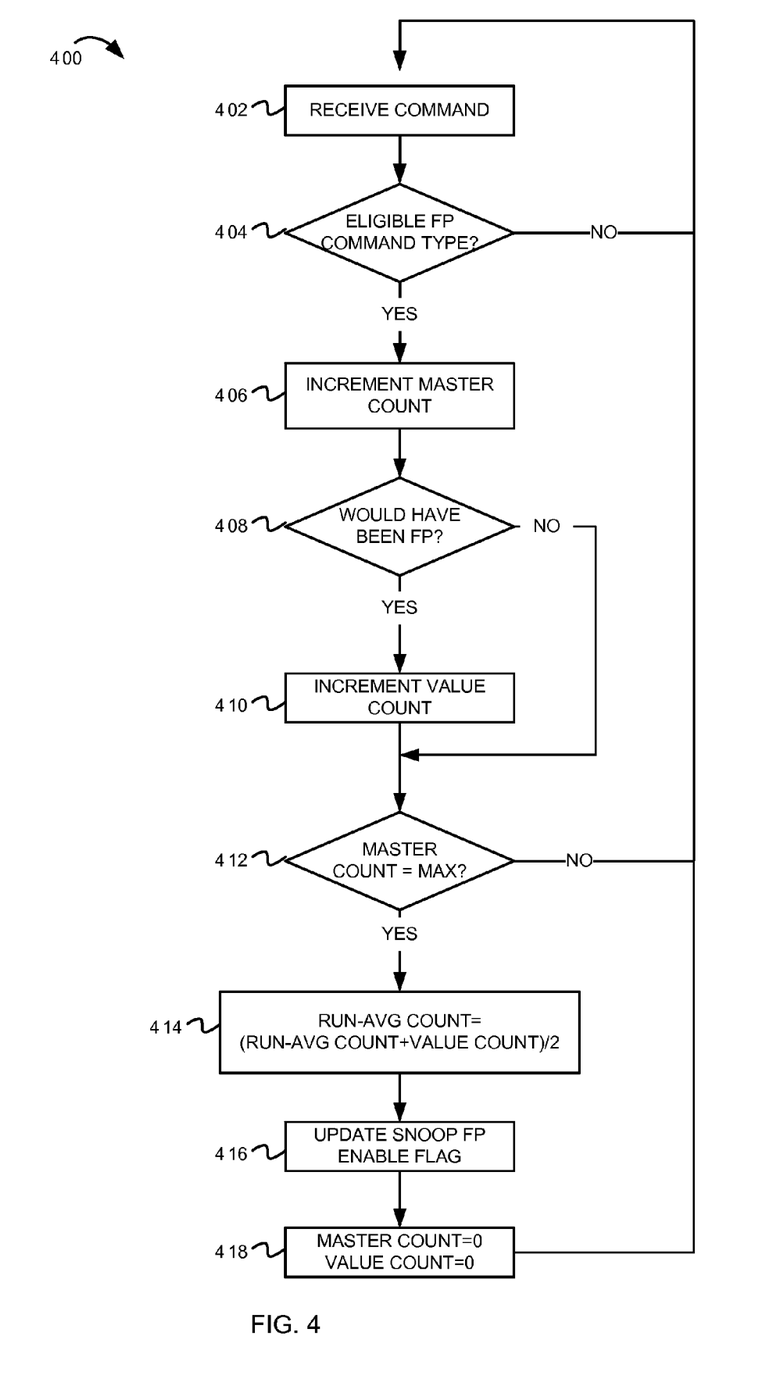
FIG. 4 is a flow chart illustrating a method for maintaining data used in embodiments.

FIG. 4 is a flow chart illustrating a method 400 for maintaining data used in embodiments. Method 400 starts at block 402 when arbitrated bus 112 receives a command.

At block 404, FP heuristic logic 210 determines if the command is an eligible fastpath command. Various factors may be considered to determine if a command is an eligible fastpath command. In some embodiments, instructions that read data from a memory location (e.g., various types of load instructions) are eligible for fastpath processing while store instructions are not eligible. Further, in some embodiments, instruction load requests are not eligible for fastpath processing. Additionally, because the fastpath bus 110 is an on-chip bus, in some embodiments, the source of the command must be on the same processor chip 100 as the responding element. It should be noted that for the purposes of the check made at block 404, it is not required that the command be received over the fastpath bus in order to be an eligible fastpath command. The command may be received over a regular bus (e.g., arbitrated bus 112). If the command could have been processed as a fastpath command, then the command can be considered an eligible fastpath command.

If the check at block 404 determines that the command is not an eligible fastpath command, then the method returns to block 402 to await reception of the next command over arbitrated bus 112.

If the check at block 404 determines that the command is an eligible fastpath command, then at block 406, the method increments master count 220 to update the count of eligible fastpath commands that have been received within the current sample window.

At decision block 408, the method determines if the command received at block 402 could have been processed as a fastpath command. For example, in an embodiment, the determination may include determining if data requested in the command could be supplied by a local cache (e.g., a cache on the chiplet 102 receiving the command) as part of early data intervention operations supported by the local cache. That is, the method determines if a cache on the receiving chiplet 102 can provide, or could have provided, data to satisfy the request in the command. In some embodiments, a cache state is checked to determine if the local cache is the only cache on the processor 100 that could supply the most recent value for the requested memory location.

If the check at block 408 determines that the command could have been processed as a fastpath command, then at block 410 value count 218 is incremented to update the count of eligible fastpath commands for which the local cache could have performed early data intervention. It should be noted that value count 218 is incremented if it is possible that the cache could supply a value. For the purposes of maintaining the counter, it is not relevant whether the cache actually does supply the value. If the check at block 408 determines that the command could not have been processed as a fastpath command, the method proceeds to block 412.

At block 412, a check is made to determine if the master count 220 value has reached a predetermined or configurable maximum value. The maximum value may be determined based on the size of the counter used to hold the master count value. Alternatively, the maximum value may be configured to set a sample window size. If master count 220 value is not equal to the maximum value, then the method returns to block 402 to await reception of the next command over arbitrated bus 112.

If the check at block 412 determines that master count 220 has reached the predetermined or configured maximum value, then the current sample window is ended and various values may be set or reset for a new sample window.

In some embodiments, at block 414, the run-avg count 216 value is set according to the formula run-avg=(run-avg+value count/master count)/2. Those of skill in the art having the benefit of the disclosure will appreciate that other statistical measures or formulas that represent a history of fastpath eligibility could be used and are within the scope of the inventive subject matter.

At block 416, the snoop FP enable flag 222 is set according to the updated value of run-avg count 216. Details on how the snoop FP enable flag 222 is determined are provided below with reference to FIG. 5.

At block 418, the master count 220 and the value count 218 are reset to zero after the run-avg value has been set, and a new sample window is begun. The method returns to block 402 to await reception of the next command over arbitrated bus 112 or fastpath bus 110.

Figure 5:
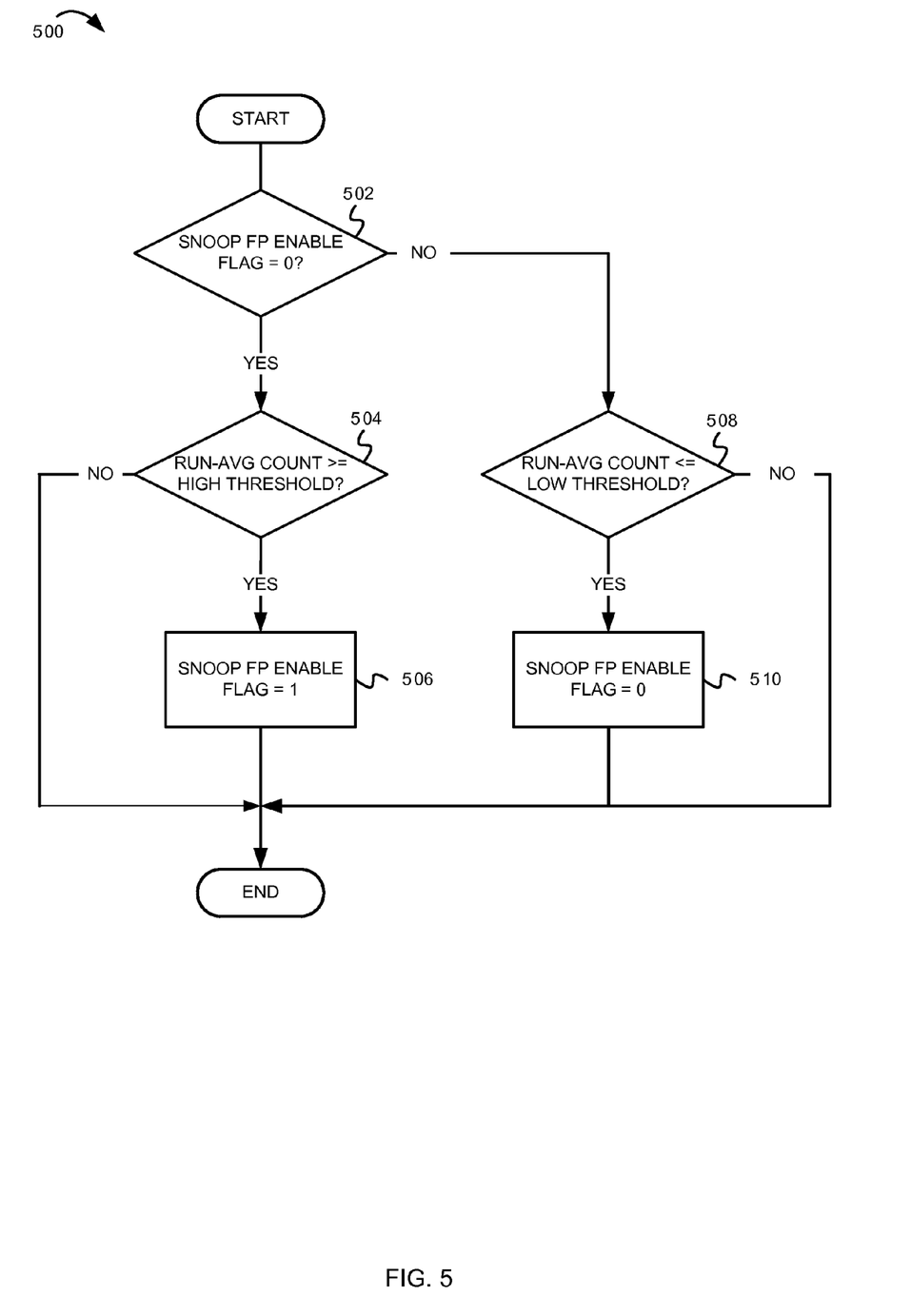
FIG. 5 is a flow chart illustrating a method for dynamically enabling or disabling snooping commands on a bus according to embodiments.

FIG. 5 is a flow chart illustrating a method 500 for setting or resetting snoop FP enable flag 222 according to the values maintained by method 400, and in particular, provides further details on the operation of block 416 of FIG. 4. Method 500 begins at block 502 with determining if fastpath snooping is enabled by consulting snoop FP enable flag 222.

If snoop FP enable flag 222 is zero indicating that fastpath snooping is not enabled, then at block 504, a check is made to determine if the current value of the run-avg count 216 is greater than or equal to a predetermined or configurable high threshold 214 value. If the run-avg count 216 value is greater than or equal to the high threshold 214 value, then at block 506 fastpath snooping is enabled by setting snoop FP enable flag 222 to 1, otherwise the process terminates.

If the check at block 502 determines that fastpath snooping is currently enabled then the method proceeds to block 508 to determine if the run-avg count 216 value is less than or equal to a predetermined or configurable low threshold 212 value. If the run-avg count 216 value is less than or equal to the low threshold 212 value, then at block 510 fastpath snooping is disabled.

As noted above, the high threshold and the low threshold can be configurable. As an example, an administrator may configure values for the high threshold and low threshold based on expected characteristics of workloads executing on one or more processors 100. In some example implementations, the high threshold is configured at 80% and the low threshold at 20%. Thus if a cache is able to provide for early data intervention at least 80% of the time, then fastpath snooping is enabled. If the cache then falls below providing early data intervention 20% of the time, then fastpath snooping is disabled, thereby saving power and processing resources when it is unlikely that a local cache can supply a value for early data intervention for a bus command.

It can be desirable to provide a gap between the high threshold 214 and low threshold 212 values such that there is a dead zone in between the high threshold and low threshold in which the snoop FP enable value will not be modified. Providing such a gap can provide hysteresis in the system with respect to enabling and disabling fastpath bus snooping.

Figure 6:
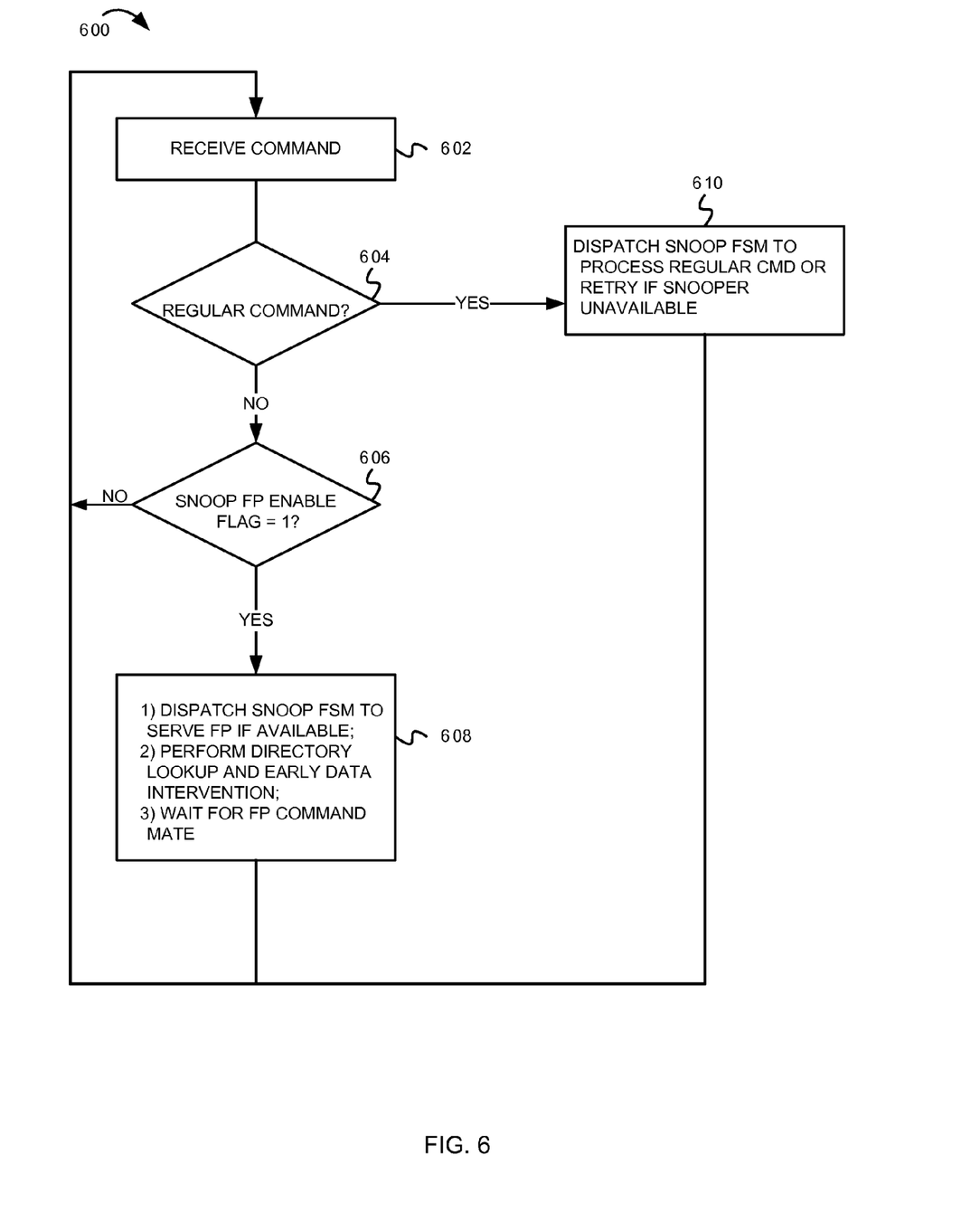
FIG. 6 is a flow chart illustrating a method for filtering fastpath commands based at least in part on whether snooping is enabled or disabled.

FIG. 6 is a flow chart illustrating a method 600 for filtering fastpath commands based at least in part on whether snooping is enabled or disabled. Method 600 begins at block 602 when a command is received over a bus such as a fastpath bus 110 or arbitrated bus 112.

At block 604, cache control logic 202 determines if the command received at block 602 is a regular command (e.g., FP here=0). If the command is a regular command, then at block 610 the cache control logic 202 dispatches a snoop finite state machine to process the regular command if a snooper is available. If a snooper is not available, then the cache control logic 202 can indicate the command should be retried at a later point in time.

If the check at block 604 determines that the command is not a regular command (e.g., FP here=1) then a fastpath command has been received. The method proceeds to block 606.

At block 606, cache control logic 202 determines if fastpath snooping is enabled (e.g., snoop FP enable flag 222=1). If fastpath snooping is not enabled, then the method returns to block 602 to await reception of the next command over arbitrated bus 112 or fastpath bus 110.

If the check at block 606 determines that fastpath snooping is enabled, then the method proceeds to block 608. At block 608, the fastpath command is dispatched to a snoop finite state machine if one is available. If a snoop finite state machine is not available, fastpath processing of the command ends and the process returns to block 602 to await reception of the next command. It can be assumed that the command will be processed when it is received as an FP mate command.

If a snoop finite state machine is available, a directory lookup is performed to determine if the requested data is in a cache line of the chiplet receiving the command. In addition, a check is made to determine if early data intervention is possible from the receiving chiplet. The check may include determining if the directory lookup found the requested cache line, and that the cache line is in an eligible state such that a fastpath response can be provided. If early data intervention can be performed by the chiplet, then a fastpath response to the command is provided. In addition, the L2 cache control logic awaits receipt of the fastpath command mate over the regular bus (e.g., bus 112)

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more machine readable medium(s) having machine readable program code embodied thereon.

Any combination of one or more machine readable medium(s) may be utilized. The machine readable medium may be a machine readable signal medium or a machine readable storage medium. A machine readable storage medium may be, for example, but not limited to, an electronic, magnetic, optical, electromagnetic, or semiconductor system, apparatus, or device, or any suitable combination of the foregoing. More specific examples (a non-exhaustive list) of the machine readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a machine readable medium may be transmitted using any appropriate medium, including but not limited to wireless, wireline, optical fiber cable, RF, etc., or any suitable combination of the foregoing.

Program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by machine executable instructions. These machine executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These machine executable instructions may also be stored in a machine readable medium that can direct a computer, logic component, other programmable data processing apparatus, or other devices to function in a particular manner, such that the instructions stored in the machine readable medium produce an article of manufacture including instructions which implement the function/act specified in the flowchart and/or block diagram block or blocks.

The machine executable instructions may also be loaded onto a computer, firmware, other programmable data processing apparatus, or other devices to cause a series of operational steps to be performed on the computer, firmware, other programmable apparatus or other devices to produce a computer implemented process such that the instructions which execute on the computer, firmware or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for enabling or disabling snooping on a fastpath bus as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A processor comprising:
    a plurality of chiplets, wherein the chiplets include processor cores and caches;
    a first bus communicably coupling the processor cores and caches;
    a second bus communicably coupling the processor cores and caches; and
    cache logic on a chiplet, the cache logic configured to:
        receive a command via the first bus;
        determine whether the command is eligible for handling by the second bus;
        determine whether or not a local cache on the chiplet can satisfy a request for data specified in the command;
        update statistical data indicating an ability of the local cache to satisfy the request for data, the statistical data including data determined based, at least in part, on the determination of whether the command is eligible for handling by the second bus; and
        determine, based at least in part on the statistical data, whether to enable or disable snooping on the second bus.

2. The processor of claim 1, wherein the statistical data includes an average value comprising an average of a number of times the local cache would have been able to respond to previous requests for data.

3. The processor of claim 2, wherein the cache logic is configured to enable snooping on the second bus when the average value crosses a high threshold value.

4. The processor of claim 2, wherein the cache logic is configured to disable snooping on the second bus when the average value crosses a low threshold value.

5. The processor of claim 1, wherein the first bus is an arbitrated bus and the second bus is a fastpath bus.

6. The processor of claim 1, wherein the statistical data includes one or more counters maintained on the chiplet.

7. The processor of claim 1, wherein the cache logic configured to determine whether or not the local cache can satisfy the request for data specified in the command includes cache logic to determine whether or not the local cache is an only cache on the processor that can supply a most recently updated copy of the data.

8. A non-transitory machine readable storage medium having machine executable instructions stored thereon, the machine executable instructions for causing a logic unit to perform operations comprising:

receiving a command via a first bus communicably coupling a plurality of processor cores and caches of a plurality of chiplets on a processor;

determining whether or not a local cache of a chiplet of the plurality of chiplets can satisfy a request for data specified in the command;

determining whether the command is eligible for handling by a second bus communicably coupling the plurality of processor cores and the caches;

updating statistical data maintained on the chiplet, the statistical data indicating an ability of the local cache to satisfy the request for data, the statistical data including data determined based, at least in part, on the determination of whether the command is eligible for handling by the second bus; and determining, based at least in part on the statistical data, whether to enable or disable snooping on the second bus by the local cache.

9. The non-transitory machine readable storage medium of claim 8, wherein updating statistical data comprises updating an average value comprising an average of a number of times the local cache would have been able to respond to previous requests for data.

10. The non-transitory machine readable storage medium of claim 9, wherein the operations further comprise enabling snooping on the second bus when the average value crosses a high threshold value.

11. The non-transitory machine readable storage medium of claim 9, wherein the operations further comprise disabling snooping on the second bus when the average value crosses a low threshold value.

12. The non-transitory machine readable storage medium of claim 8, wherein the second bus is a fastpath bus.

13. The non-transitory machine readable storage medium of claim 8, wherein updating statistical data includes updating one or more counters maintained on the chiplet.

14. The non-transitory machine readable storage medium of claim 8, wherein determining whether or not the local cache can satisfy the request for data specified in the command includes determining whether or not the local cache is an only cache on the processor that can supply a most recently updated copy of the data.

* * * * *